United States Patent [19]

Markwitz et al.

[11] 4,064,459
[45] Dec. 20, 1977

[54] METHOD OF AUTOMATICALLY TESTING THE SERVICEABILITY OF A DATA TRANSMISSION SYSTEM

[75] Inventors: Wernhard Markwitz; Volker Dümichen, both of Munich, Germany

[73] Assignee: Siemens Aktiengesellschaft, Munich, Germany

[21] Appl. No.: 703,920

[22] Filed: July 9, 1976

[30] Foreign Application Priority Data

July 9, 1975 Germany .............................. 2530633

[51] Int. Cl.² ........................................... H04B 17/00
[52] U.S. Cl. .................. 325/67; 179/15 BF; 179/175.3 R; 325/41; 340/146.1 E
[58] Field of Search .................. 325/2, 41, 67; 179/15 BF, 175.3 R, 175.31 R; 340/146.1 E; 324/57 N, 57 PS, 58 R, 58 A

[56] References Cited

U.S. PATENT DOCUMENTS

| | | | |
|---|---|---|---|
| 3,430,144 | 2/1969 | Murakami et al. | 179/15 BF |
| 3,622,877 | 11/1971 | MacDavid et al. | 340/146.1 E |
| 3,655,915 | 4/1972 | Liberman et al. | 179/175.3 R |
| 3,743,938 | 7/1973 | Davis | 179/15 BF |
| 3,819,878 | 6/1974 | Pine et al. | 179/175.3 R |
| 3,956,601 | 5/1976 | Harris et al. | 179/175.3 R |

*Primary Examiner*—Robert L. Griffin
*Assistant Examiner*—Marc E. Bookbinder
*Attorney, Agent, or Firm*—Schuyler, Birch, Swindler, McKie & Beckett

[57] ABSTRACT

A method is described for testing the transmission quality of a data transmission system in its operational state. During a test key actuation data bits having a specific marking polarity and at least one additional bit having a polarity corresponding to the spacing condition are transmitted. At a receiving station the latter transmitted bit group is analyzed for disturbances. In the event of multiple undisturbed reception of the aforementioned bit pattern a visual indication is produced. At the same time, in the receiving station, the data output of the receiver is connected to the transmitter, and the aforementioned bit pattern is transmitted back to the testing station. With multiple undisturbed reception of the bit pattern a visual indication is produced in the testing station. During the test procedure the data input and output units are blocked.

8 Claims, 1 Drawing Figure

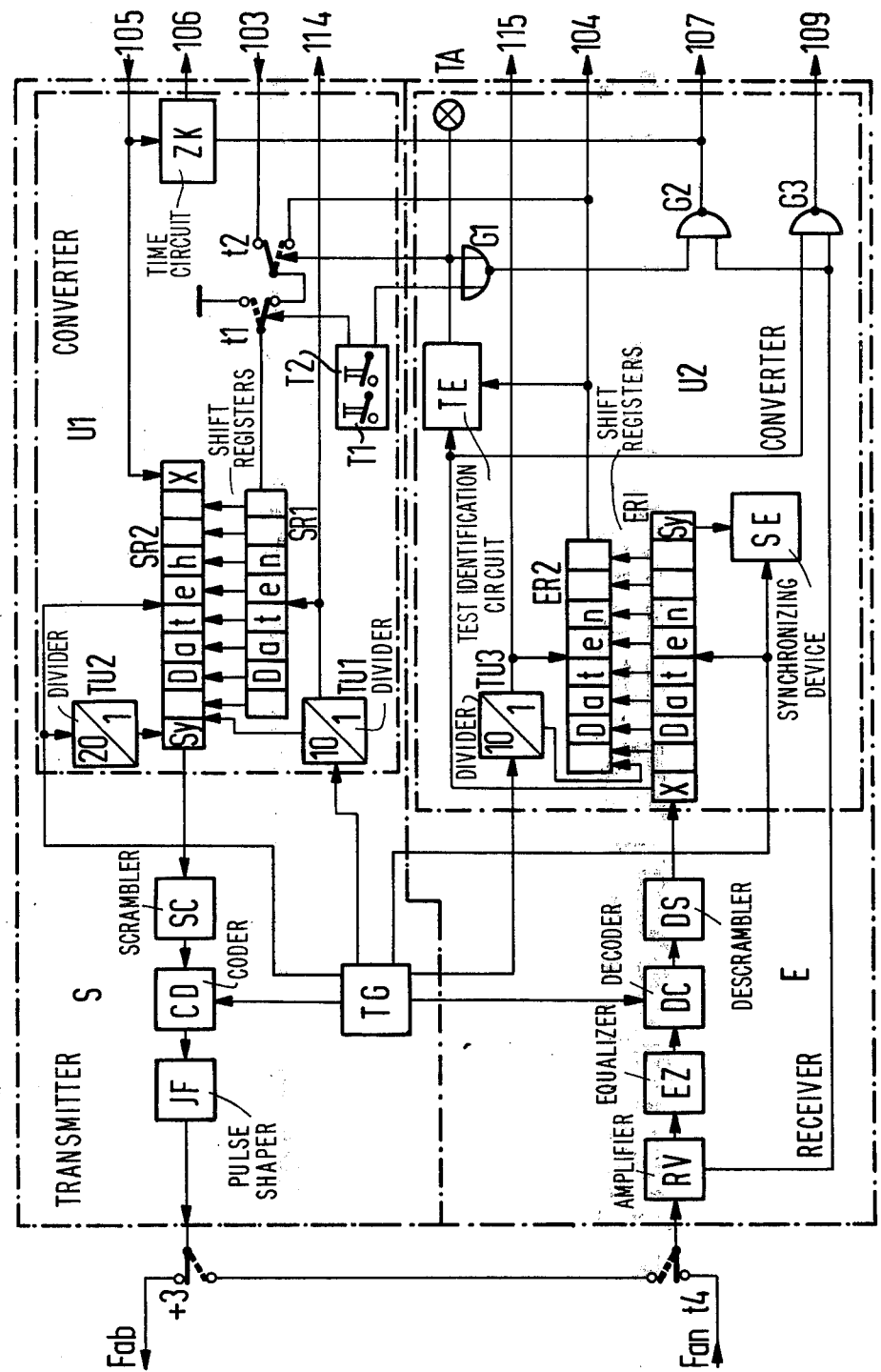

METHOD OF AUTOMATICALLY TESTING THE SERVICEABILITY OF A DATA TRANSMISSION SYSTEM

BACKGROUND OF THE INVENTION

This invention relates to a method of automatically testing the quality of transmission in a data transmission system in which, in the operational state and during data transmission based upon the established code, other bits are transmitted in addition to the data bits.

In data transmission, it is frequently necessary, when connections are being developed, to test the data transmission system for proper operation prior to data transmission or during a pause in transmission. It is already well known, in determining the quality of the transmission system to carry out distortion measurements or error rate measurements. However, this requires the use of test message transmitters and test message receivers or special pulse shapes have to be transmitted and evaluated. Whatever the case, the analysis of the transmission system necessitates an additional expense, and the operating conditions are not precisely adhered to. Where measurements of quality are concerned, the presence of an operator at the station located at the other end of the link is necessary, this in order to switch in the items of equipment required for carrying out the measurements and to transmit back resultant measurements to the station carrying out the measuring.

An object of this invention is to provide a method of testing the transmission quality in a data transmission system, which enables the entire system to be tested automatically while in service.

SUMMARY OF THE INVENTION

In accordance with the invention, the foregoing and other objects are achieved in that in the transmitter of one station, during the time of actuation of a first key, data bits having a specific marking polarity and one or more of the additionally transmitted bits having a polarity corresponding to the spacing condition are transmitted. In the receiver at the station disposed at the other end of the link, a first test identification circuit analyzes the received marking condition in the data bits and the spacing condition of the additionally transmitted bits. In the event of multiple undisturbed reception of the predetermined bit pattern a visual indication is produced in the receiving station, and the data output of the receiver in the latter station is connected to the data input of the transmitter. The transmitter in the receiving station transmits the received bit pattern, and in the receiver of the testing station a second test identification circuit analyzes the bit pattern. With multiple undisturbed reception of the bit pattern a visual indication is produced. During the test procedure the test identification circuits in the two stations block the data input and the data output units. After the release of the first key, the transmission system reverts to the inoperative state.

The inventive method makes it possible, by the automatic formation of test loops at the testing station and in the station at the other end of the link, to test the complete transmission system. Looping and testing are performed automatically. In the station at the other end of the link no operator is needed. A phase disparity between the transmitting and received pulse does not affect the test procedure. The procedure is also suitable for pulse code modulated (PCM) links or multiplex links. At the end of testing, the transmission system automatically reverts to the condition which prevailed prior to testing. The operating conditions are adhered to precisely because during the test procedure transmission is conducted under the code conditions defined for data transmission. No additional information is transmitted through the transmission system. Again, there is no necessity for the connection of additional measuring equipment. The display of the test result is produced using a luminescent diode.

BRIEF DESCRIPTION OF THE DRAWING

Details of the invention will be explained hereinbelow by describing a preferred embodiment making reference to a single FIGURE drawing containing a block circuit diagram of a single station having a transmitter and a receiver.

DETAILED DESCRIPTION OF A PREFERRED EMBODIMENT

In the FIGURE, the block circuit diagram shows one of the two stations of a data transmission system having a transmitter S and a receiver E. In a converter U1 in the transmitter S, additional bits are introduced. In this fashion, the subscriber transmission speed is converted to a higher transmission speed on the transmission line. The data bit flow from the subscriber passes, via the line 103 and the contacts t1 and t2, to a data shift register SR1 operating at 0.8 times the line speed. When eight data bits have entered the shift register, they are transferred by a transfer pulse from a pulse rate divider TU1 into the shift register SR2 where a synchronizing bit Sy is prefixed to the data and a status bit X added at the end. The status bit, in the inoperative state, has the binary state "0", and in the operative state, the binary state "1". The operative state is defined as that state in which both the input line 105 (switch in transmitting station) and the line 106 (ready for transmission) are in the operative state. Via the line 105, the data input unit signals a request to transmit by putting out the "1" state. After about 70 to 80 line bit cycles, via the line 106, readiness for transmission is signalled, and data transmission commences. The delay is produced by means of the timer circuit ZK. The status bit acquires the binary state "0" when the control line 105 is in the off state. The synchronizing bit in each case preceding the eight data bits, changes polarity after 8 data bits. The synchronizing bit enables the receiver to select out the data bits and recover the status bit from the bit flow. Each bit group in the bit flow will comprise, for example, 8 data bits preceded by a synchronizing bit and followed by a status bit. In this context, the position of these bits can also be exchanged or both bits may be located either at the beginning or at the end of the bit group. The pulse trains required for the transmission and reception of the data are produced by a central pulse generator TG in the data transmission unit. The pulse train at the input of pulse rate divider TU2 corresponds to the transmitting pulse train, for example 3 kHz. At the input of the pulse rate divider, TU1, a pulse train of eight times the transmitting pulse train, for example 24 kHz, is applied from which the pulse rate divider TU1 forms a transmitting pulse train of 2.4 kHz used on the line 114 to call up the data from the data input unit. By the insertion of the additional bits, the subscriber data speed is changed from 2.4 kBit/sec. to 3 kBit/sec. on the transmission line. The bits contained in the shift register SR2 are fed out at the 3 kHz bit rate and pass through a scrambler SC, a coder CD and pulse-shaper IF to an outgoing transmission line $F_{ab}$.

The bit flow passing from the transmitter of the station at the other end of the link passes through the transmission line $F_{an}$, a variable gain amplifier RV, an equalizer EZ, a decoder DC and a descrambler DS, into the shift register ER1 at the transmitting rate determined by the pulse generator TG of the data transmission unit.

In converting unit U2 of the receiver E, the data bits are separated from the bit flow and supplied through the line 104 to the data output units. Furthermore, from the received status bits X, in association with the level monitoring function in the variable gain amplifier RV, a signal is supplied through gate G3 to line 109 to indicate the received level and the state of the station at the other end of the link.

Synchronizing device SE, at the receiving end, triggers a synchronizing operation, if, at the time of transfer of the data bits from shift register ER1 to shift register ER2, the synchronizing bits are not of the appropriate polarity. The transfer of the data bits takes place with the appearance of the transfer pulse which is produced in each case after ten line bits. A pulse train eight times the frequency of the receiving pulse train is applied to pulse rate divider TU3, and after the division operation, is supplied to line 115 as the receiving pulse train of a frequency 2.4 kHz, in order to transfer the individual data bits into the data output unit.

The receiver, via the line 107, supplies a control signal to the data terminal equipment, indicating readiness for operation. Where readiness for operation of the transmitter, and therefore the development of the operative state on the line 106, are concerned, it is a prerequisite that the line 107 should produce a signal indicating operational readiness on the part of the station. If the station at the other end of the link is not ready for operation, then the line 107 carries the spacing condition and the line 106 does not change to the condition which corresponds with readiness for transmission.

In accordance with the invention, both the transmitter and receiver contain simple test devices to test the functioning of the overall transmission system. In the transmitter S there are two push-buttons T1 for "distant test" and T2 for "near test." If the push-button T1 is depressed, then a test signal is transmitted from the transmitter output via the line to the station at the other end of the link where a test identification circuit analyzes the test signal and retransmits it to the testing station. At the receiver output of the testing station, the test signal is analyzed in the test identification circuit, and a visual indication is produced. This indicates that the station in question, the out and return lines and the remote station in communication herewith, are operating normally. If the visual indication is not produced, then a near test can be used to check the serviceability of the two stations. In this context, for actuating push-button T2 the output of the transmitter is connected to the input of the receiver in the testing station by means of the contacts $t3$ and $t4$.

By depressing the push-button T1 or T2, through the gates G1 and G2, the line 107 is placed in the off state for the duration of the test so that, via the line 106, no signal indicating readiness for transmission can be transmitted. Consequently, during the test operation no data are called up from the data input units and the status bit X acquires the inoperative state "0". At the same time, for the duration of the test, key T1 or T2 of the contact $t1$ is placed in the position shown in broken line so that for the data bits the marking state "0" is fed into the shift register SR1. In the shift register the synchronizing bit Sy is introduced with its normal polarity change after every 10 line bits, and the status bit X introduced in the inoperative or spacing state "0". The bit pattern in the shift register SR2 is transmitted to the remote station and there analyzed in the test identification circuit. The receiver detects the test signal by virtue of the fact that both the data bits and the status bit have the "0" condition. The test identification circuit TE is supplied with the data bits and the status bit. A counter in the identification circuit counts the bit groups adding the spacing state "0", the marking condition counter in the identification circuit reaches its full count and drives a trigger stage from the inoperative state into the operative state so that a luminescent diode responds.

The output signal from the trigger stage in the station at the other end of the link places the contact $t2$ in the position shown in broken line. Consequently, the output line 107 is placed in the off state so that no signal indicating readiness for transmission can be applied via the line 106 to the data input units of the distant station. Further, the data bits indicating the spacing state "0" are introduced into the shift register SR1 of the transmitter at the remote station. The transmitter in the remote station transmits the test signal back to the testing station. This is analyzed in the test identification circuit TE in the receiver of the testing station. The test identification circuit, after identifying seven to eight bit groups having the spacing condition "0", transmits a signal producing a visual indication TA. At the same time, the line 107 is maintained in the off state by means of the gates G1 and G2 and in this fashion the transmission of the signal indicating readiness for transmission, via the line 106, is inhibited. The visual indication TA extinguishes when either seven to eight bit groups having the marking state "1" in the case of the data bits, and the state "0" in the case of the status bit, have been detected or when a polarity change in the subscriber message takes place or when the line 109 goes to the on condition. The latter only occurs, however, when no testing is taking place. The counter counting the marking condition in the identification circuit is likewise reset with each polarity change in the subscriber message. Resetting, however, also takes place if the synchronizing bits are faulty. This prevents a marking state "0" at the data input of the receiver from simulating a test. Even when synchronizing is during the active phase, the spacing condition counter is reset.

The push-button T1 is released on receipt of the visual test acknowledgement. The testing station then sends the marking condition "1" for the data bits. The non-testing station sends this data bit marking condition back. This condition corresponds to the spacing condition if the data input units are not transmitting any data. Both stations identify the "1" marking condition on the part of the data bits so that in the test identification circuit TE the marking condition counter and the trigger stage are returned to the reset position and the visual indication extinguishes. If, at the station carrying out the test by depression of the push-button T1, the visual indication does not light up, then an attempt must be made to pinpoint the fault. The actual transmitting section, the outgoing line and the receiving section in the distant station are serviceable if the visual indication does appear at the distant station. Then, whether or not the receiver in the testing station, the transmission link or the transmitter at the distant station is defective, can only be determined by a near test depending upon whether this test is successful or not. In the near test, the push-button T2 is depressed, and this triggers the same processes already described above in the transmitter. The test signal, however, is not supplied to the station at the other end of the link because during the time of actuation the contacts t3 and t4 are placed in the position shown in broken line. This means that the outgoing line $F_{ab}$ and the incoming line $F_{an}$ are disconnected, and the output signal from the transmitter is applied to the receiver in its own station, namely the testing station. The receiver analyzes the test signal in the above described manner, and if the test is positive, it triggers the visual indication. The distant station is cut off from the signal level by the disconnection of the line $F_{ab}$ at the testing station. Because of the level monitoring facility, in the distant station the lines 107 and 109 are placed in the inoperative or spacing condition.

It is claimed:

1. A method of automatically testing the transmission quality of a data transmission system, comprising the steps of:
   transmitting from a testing station during actuation of a first key a bit group containing data bits having a given marking polarity and at least one additional bit corresponding to a spacing condition,
   receiving said bit group in a receiving station,
   analyzing said received bit group for transmission disturbances,
   producing a visual indication is said receiving station in the event of mulitple undisturbed reception of said bit group,
   connecting, in the event of multiple undisturbed reception of said bit group, a receiver in said receiving station to a transmitter therein and retransmitting said bit group to said testing station,
   analyzing said retransmitted bit group for transmission disturbances,
   producing a visual indication in said testing station in the event of multiple undisturbed reception of said retransmitted bit group and
   blocking data input and output circuits in said testing and receiving stations during performance of the foregoing testing method.

2. The method defined in claim 1 wherein said bit group comprises a block of data bits, a synchronizing bit and a status bit.

3. The method defined in claim 2 wherein said synchronizing bit is transmitted with a predeterined polarity and said status bit is transmitted with a polarity corresponding to said spacing condition.

4. The method defined in claim 1 wherein said analyzing steps include counting with a marking counter the repetitions of said bit group and, upon reaching a predetermined maximum count, triggering said visual indications.

5. The method defined in claim 4 comprising the additional step of:
   rendering the marking counter inoperative upon appearance of a status bit indicating the system to be operative.

6. The method defined in claim 4 comprising the additional step of:
   returning said marking counter to its inoperative state when said analyzing steps indicate the status bits to be faulty.

7. The method defined in claim 4 comprising the additional step of:
   resetting said marking counter upon reception of a plurality of said bit groups not having said marking polarity.

8. The method defined in claim 1 comprising the additional steps of:
   transmitting a status bit indicating the operative state of the system when said first key is released and
   extinguishing said visual indications upon reception of a plurality of said operative state status bits.

* * * * *